US008082470B2

(12) United States Patent
Rothman et al.

(10) Patent No.: US 8,082,470 B2
(45) Date of Patent: Dec. 20, 2011

(54) SHARE RESOURCES AND INCREASE RELIABILITY IN A SERVER ENVIRONMENT

(75) Inventors: Michael A. Rothman, Puyallup, WA (US); Vincent J. Zimmer, Federal Way, WA (US); Gregory P. McGrath, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/711,109

(22) Filed: Feb. 23, 2010

(65) Prior Publication Data

US 2010/0153603 A1    Jun. 17, 2010

Related U.S. Application Data

(62) Division of application No. 10/882,782, filed on Jun. 30, 2004, now Pat. No. 7,698,487.

(51) Int. Cl.
*G06F 11/00* (2006.01)
(52) U.S. Cl. .......................................................... 714/36
(58) Field of Classification Search ...................... 714/36
See application file for complete search history.

(56) References Cited

U.S. PATENT DOCUMENTS

| | | | |
|---|---|---|---|
| 5,276,684 A | | 1/1994 | Pearson |
| 7,138,733 B2 | | 11/2006 | Sanders et al. |
| RE39,855 E | * | 9/2007 | Wong ............................... 307/140 |
| 7,293,165 B1 | * | 11/2007 | Tobias .............................. 713/1 |
| 2003/0069953 A1 | * | 4/2003 | Bottom et al. ................ 709/223 |
| 2003/0188176 A1 | * | 10/2003 | Abbondanzio et al. ....... 713/191 |
| 2004/0153639 A1 | * | 8/2004 | Cherian et al. ................... 713/2 |
| 2004/0243798 A1 | * | 12/2004 | Goud et al. .................... 713/100 |
| 2005/0060432 A1 | * | 3/2005 | Husain et al. .................. 709/246 |
| 2005/0068888 A1 | * | 3/2005 | Komarla et al. ............... 370/216 |
| 2005/0071675 A1 | * | 3/2005 | Chu et al. ....................... 713/201 |
| 2005/0251855 A1 | * | 11/2005 | Brandstatter .................... 726/12 |
| 2005/0259395 A1 | | 11/2005 | Espinoza-Ibarra et al. |
| 2007/0067263 A1 | * | 3/2007 | Husain et al. ...................... 707/2 |
| 2008/0046708 A1 | * | 2/2008 | Fitzgerald et al. ................ 713/2 |
| 2008/0215844 A1 | | 9/2008 | Thomas |
| 2008/0301692 A1 | | 12/2008 | Billau et al. |
| 2009/0150528 A1 | * | 6/2009 | Tanabe et al. ................. 709/221 |

OTHER PUBLICATIONS

Sun Microsystems, Inc., The Next Wave: Blade Server Computing. Copyrighted 2002. pp. 1-17.
Network Windows & Net Magazine, Blade Servers by William Sheldon, Jul. 2003. pp. 1-3.
Bio-IT World, Bio IT Bulletin. IBM Announces New Blade Server Line by Bob Brewin of Computerworld. Published Sep. 25, 2002.

(Continued)

*Primary Examiner* — Bryce Bonzo
(74) *Attorney, Agent, or Firm* — Blakely, Sokoloff, Taylor & Zafman LLP

(57) ABSTRACT

Methods and systems for a low-cost high density compute environment with increased fail-over support through resource sharing and resources chaining. In one embodiment, one of a number of servers qualified to share resources is elected as a resource server. The shared resource can be firmware memory, hard-drive, co-processor, etc. The elected server responds to requests from individual requesters and provides the responses, such as firmware images. In one embodiment, all the blade servers on a rack use an image server for their firmware image so that these blade servers can automatically adopt a common personality across the entire rack. If the elected image server fails, a dynamic process elects an alternate image server. In one embodiment, among a set of qualified servers, only one is actively elected at a given time.

13 Claims, 13 Drawing Sheets

OTHER PUBLICATIONS

Fujitsu-Siemens Comptuers, Data Sheet for Primergy BX30 Blade Server (3U). Issue date Jan. 14, 2004. pp. 1-4.

Network Windows & Net mAGAZINE, Fault-Tolerant Servers by Mark Weitz, Jan. 2003.

* cited by examiner

SHARE RESOURCES AND INCREASE RELIABILITY IN A SERVER ENVIRONMENT

CROSS REFERENCE TO RELATED APPLICATIONS

This application is a divisional of application Ser. No. 10/882,782 filed Jun. 30, 2004.

FIELD

At least some embodiments of the invention relate to a server environment with multiple servers, and more specifically, to resource sharing and fault tolerance in multiple servers, such as blade servers.

BACKGROUND

During a computer system startup, the computer system is self-tested and initialized through loading and execution of system firmware. Under personal computer (PC) architectures, this firmware is commonly referred to as the system's Basic Input/Output System (BIOS). In a typical PC architecture, the BIOS is the firmware that runs between the processor reset and the first instruction of the Operating System (OS) loader. The BIOS provides a basic set of instructions used to boot the computer. The BIOS performs the tasks that need to be done at startup including performing self diagnostics and initializing the hardware in the computer, such as the Power On Self Test (POST) which determines if the computer keyboard, random access memory, disk drives, and other hardware are working correctly. The BIOS also acts as an interface between software and hardware components of a computer system during the OS runtime. For example, the BIOS manages data flow between the operating system running in the computer and the attached devices such as the hard disk, video adapter, keyboard, mouse, and printer. As computer systems have become more sophisticated, the operational environment between the application and OS levels and the hardware level is generally referred to as the firmware or the firmware environment.

The firmware is typically stored in non-volatile memory, such as Read-Only Memory (ROM), Erasable Programmable Read-Only Memory (EPROM), and Electrically Erasable, Programmable, Read-Only Memory (EEPROM) or flash memory. Non-volatile memory retains the stored data after the power is removed for a period of time. The firmware may also be partially stored in volatile memory, powered by a battery to retain the stored data when the system is powered off. For example, Complimentary Metal Oxide Semiconductor (CMOS) Random Access Memory (RAM) is a small amount of volatile memory in a special RAM chip that stores the real time clock settings and configuration information for a PC. Plug-and-Play BIOS uses additional non-volatile memory to hold Extended System Configuration Data (ESCD). This is used to store system resource settings of system devices such as IRQs and I/O addresses. The content in the CMOS RAM is maintained with power from a small battery when the system is powered down. The BIOS typically provides a setup program which allows the user to adjust a variety of settings related to the BIOS operation and hardware setup such as CPU Clock speed, memory timing, time and date functions, disk configuration, etc.

Frequently, a large number of servers are used to meet the demand for computing power. A server rack typically host a number of server chassis stacked one over another vertically. To further increase the server density, multiple blade servers are designed to co-exist in one server chassis. Typically, a blade server is essentially a server computer on a circuit board, which can be installed into a slot in a server chassis. Multiple blade servers in one server chassis typically share one power supply. Thus, a blade server rack can have a number of server chassis stacked one over another vertically, with each chassis hosting a number vertically oriented blade servers arranged side by side in a row.

BRIEF DESCRIPTION OF THE DRAWINGS

The accompanying drawings illustrate by way of example and not limitation, in which like references indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order to avoid obscuring the understanding of the disclosure. References to one or an embodiment in the present disclosure are not necessarily references to the same embodiment; and, such references mean at least one.

At least one embodiment of the present invention provides a low-cost high density compute environment with increased fail-over support. Intended to be a small form-factor to increase the compute density, blade servers are typically designed to be autonomous machines that have much of the same resources of a standard server environment. Such a traditional design leads to high costs for what could otherwise be a relatively low-cost vehicle of compute power. In one embodiment of the present invention, an entity within the blade server rack is elected as a resource-sharing server. This resource-sharing server doles out access to the resources which it contains and allows the other blade servers to be highly cost-reduced. The cost-reduced blade servers do not have the added hardware requirements (e.g. flash memory, hard-drive, etc.).

In one embodiment of the present invention, one of a number of servers that have resources to share is elected as an image server. The elected image server responds to initialization requests from an individual blade server and provides the firmware image and/or other shared resource responses. In one embodiment, all the blade servers on a rack use the image server for their firmware image so that these blade servers can automatically adopt a common personality across the entire rack. Further, one embodiment of the present provides fault-tolerance through the election of an image server and, if the elected image server fails, a dynamic election process for an alternate image server. For example, in a blade server rack, a few (e.g. 1, 2, . . . , or n) of the blade servers are qualified to act as an image server, among which only one is actively elected as an image server at a given time.

Figure 1:
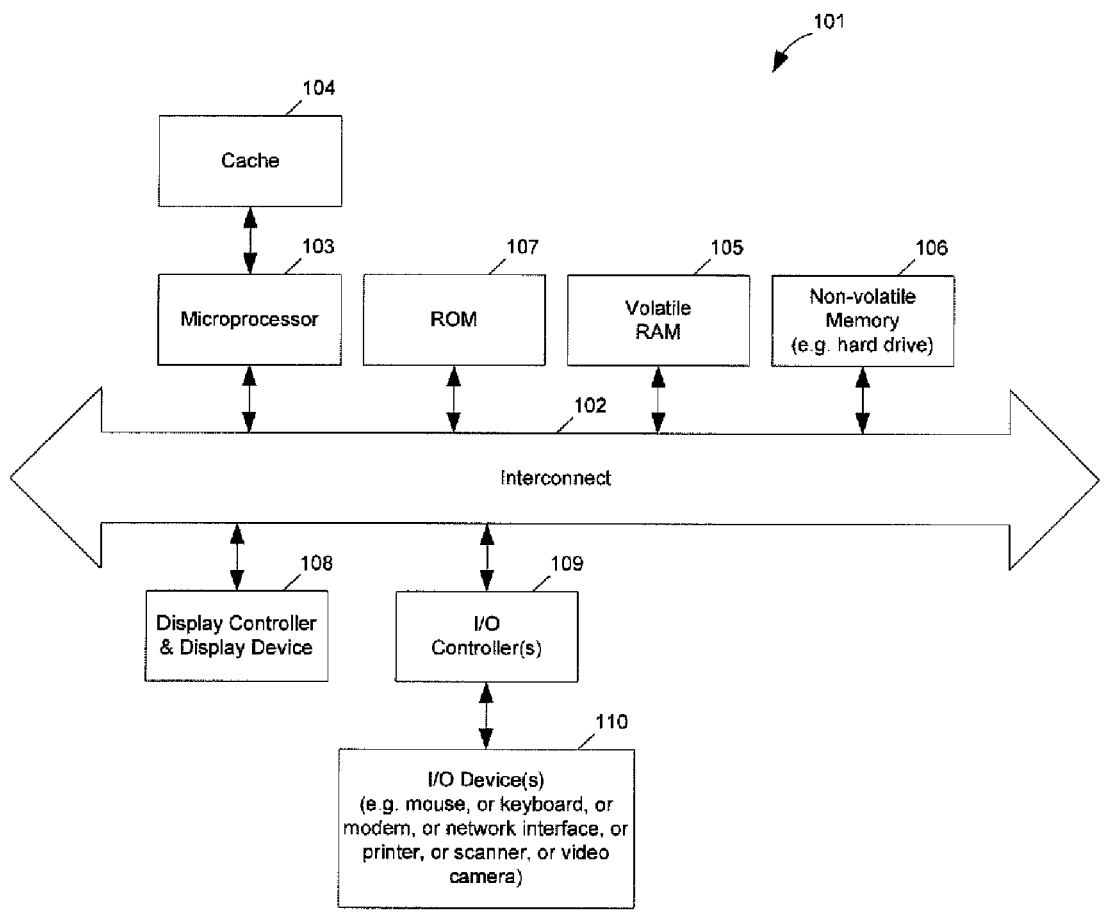
FIG. 1 shows a block diagram example of a server which may be used with the present invention.

FIG. 1 shows a block diagram example of a server which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. For example, in one embodiment, a typical blade server does not have a separate display controller and a separate display device; some blade servers in a rack are configured to have ROM and nonvolatile memory as sharable resources; and some blade servers in the rack are configured as cost-reduced servers without ROM and nonvolatile memory. Although some examples of this description illustrate the resources sharing and fault-tolerance in a blade server rack, it will be appreciated the servers are not necessarily blade servers. Further, the servers may not be server computers in the traditional client-server architecture. For example, the servers can be one of the personal computers in a cluster connected through a network (e.g., local area network or internet) according to at least some embodiments of the present invention.

As shown in FIG. 1, the computer system (101), which is a form of a data processing system, includes an interconnect (102) which is coupled to a microprocessor (103) and a ROM (107) and a volatile RAM (105) and a non-volatile memory (106). The microprocessor (103) is coupled to a cache memory (104) as shown in the example of FIG. 1. The interconnect (102) connects these various components together and may also connect these components (103, 107, 105, and 106) to a display controller and display device (108) and to peripheral devices such as input/output (I/O) devices which may be mice, keyboards, modems, network interfaces, printers, scanners, video cameras and other devices which are well known in the art. Typically, the input/output devices (110) are coupled to the system through input/output controllers (109). The volatile RAM (105) is typically implemented as dynamic RAM (DRAM) which requires power continually in order to refresh or maintain the data in the memory. The non-volatile memory (106) is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The interconnect (102) may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM (107), volatile RAM (105), non-volatile memory (106), cache (104) or a remote storage device. In various embodiments, hard-wired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor (103) or a microcontroller.

A machine-accessible medium can be used to store software and data which when executed by a data processing system causes the system to perform various methods of the present invention. This executable software and data may be stored in various places including for example ROM (107), volatile RAM (105), non-volatile memory (106) and/or cache (104) as shown in FIG. 1. Portions of this software and/or data may be stored in any one of these storage devices.

Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc.

Figure 2:
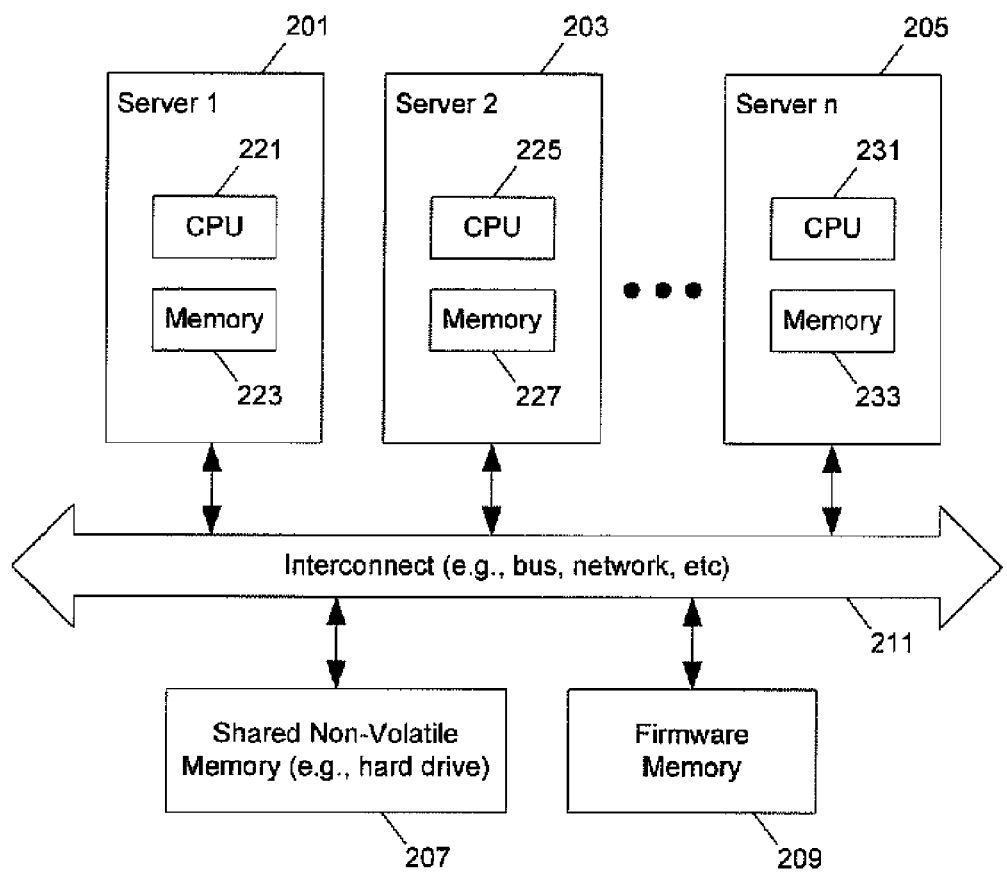
FIG. 2 shows a block diagram example of a data processing system with multiple servers sharing memory according to one embodiment of the present invention.

FIG. 2 shows a block diagram example of a data processing system with multiple servers sharing memory according to one embodiment of the present invention. In one embodiment of the present invention, an interconnect (211) connects servers (201, 203, . . . , 205) to a firmware memory (209) and a shared non-volatile memory (207). The shared non-volatile memory can be one or more hard drives. The shared non-volatile memory may store the operating system for the servers (201, 203, . . . , 205). Each of the servers has its own CPU (e.g., 221, 225, . . . , or 231) and its own memory (e.g., 223, 227, . . . , or 233), such as RAM. In one embodiment of the present invention, the servers (201, 203, . . . , 205) share the firmware memory (209) and the shared non-volatile memory (207) through the interconnect (211), which can be a bus, a network, etc. Through the sharing of the firmware memory (209) and the shared non-volatile memory (207), the set of the servers (201, 203, . . . , 205) has a reduced cost.

In one embodiment of the present invention, the firmware memory (209) and the shared non-volatile memory (207) are under the control of one of the servers (201, 203, . . . , 205), which acts as the image server of the system. For example, when the servers (201, 203, . . . , 205) are blade servers in a given rack, the cost of the system can be reduced significantly by having the majority of the population of blade servers in the rack depend on the image server; the image server proxy the hardware requests which are being shared (e.g. FLASH, hard-drive, etc.) Since the servers in the given rack uses a common shared resource for their firmware image, these servers all automatically take on the personality associated with the shared firmware image. This enables a very simple means of doing a firmware update for an entire rack population. Further, in one embodiment, the servers in the given rack use the same operating systems stored on the shared non-volatile memory (207). Different system parameters for different servers are kept in different portions of the shared non-volatile memory (207). The image server proxy the requests so that different servers get their system specific parameters from their corresponding portions of the shared non-volatile memory (207) using the same instructions.

In one embodiment of the present invention, an arbiter is used to multiplex requests to and from a common resource in a low-cost high-density blade server. For example, the interconnect (211) can be separate unique buses from each server to the arbiter, or a shared bus with different control signals for arbitration. For example, the interconnect could be a low pin count (LPC) bus. On some PC motherboards, a LPC bus is used to directly interface a Low Pin Count (LPC) family of flash memories with chipsets to supply the BIOS information. For maximum similarity to the traditional systems, the interconnects can be an LPC bus.

Figure 3:
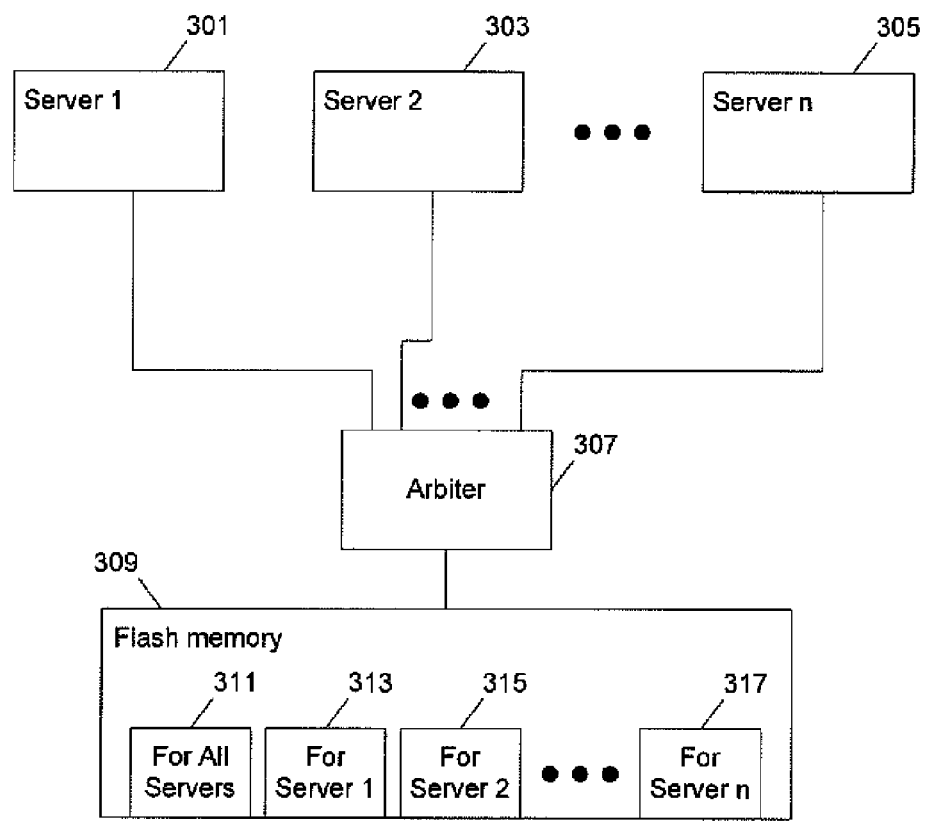
FIGS. 3-4 show block diagram examples of data processing systems with multiple servers sharing flash memory according to one embodiment of the present invention.
Figure 4:
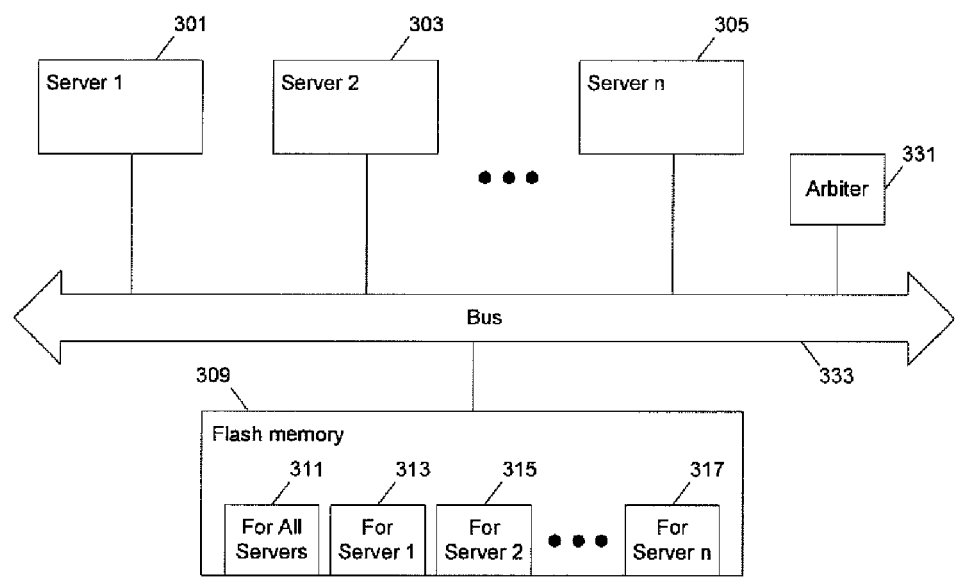

FIGS. 3-4 show block diagram examples of data processing systems with multiple servers sharing flash memory according to one embodiment of the present invention. In FIG. 3, each of the servers (301, 303, . . . , 305) has a unique bus connect to the arbiter (307), which multiplexes the access requests to, and de-multiplexes the returned data back from, the flash memory (309). The flash memory (309) has a common section for all servers (311). This section for all servers (311) can store the set of instructions for the firmware, which is common for all of the servers (301, 303, . . . , 305). The flash memory (309) may further have different sections for different servers (e.g., 313, 315 and 317). These sections can be used to store different configuration parameters for different servers. The configuration parameters for different servers can also be stored in different sections of a shared volatile memory (e.g., CMOS RAM with back-up power from a battery). FIGS. 3-4 illustrate the sharing of a flash memory. However, it is understood that an actual flash memory is not a requirement for implementation. Some types of general-purpose storage can be used to store the shared image data for the blade servers.

In one embodiment of the present invention, the arbiter automatically determines the corresponding section of parameters for a request from a bus that wins the arbitration. Thus, the servers can run the identical instructions to access their corresponding sections of parameters. Alternatively, each of the servers may individually compute the corresponding address for the system dependent parameters according to information indicating the position of system dependent sections (e.g., an identification number of the server on a rack obtained from a register or a jump).

In FIG. 4, the servers (301, 303, . . . , 305) all connect to a bus (333), such as a low pin count bus. The arbiter (331) couples to the bus (333) to arbitrate the access to the bus (333) shared among the servers (301, 303, . . . , 305). Thus, the arbiter (331) multiplexes the access requests to, and de-multiplexes the returned data back from, the flash memory (309).

From this description, one skilled in the art understands that an interconnect connecting the servers to the shared resource can have a more sophisticated topology. For example, in a given rack, the servers within each chassis may be connected to an arbiter with unique buses while the servers from different chassis are connected to a shared bus. Several levels of arbitration may be used. Further, the connections may use a network communication protocol for arbitration. Other types of access control methods, such as token passing, priority based arbitration, etc, can also be used. Furthermore, the arbitration may be based on software implementations. For example, in FIG. 2, the shared the firmware memory (209) and the shared non-volatile memory (207) can be on one of the servers (201, 203, . . . , 205), which is the image server; the interconnect (211) includes a network connection for other servers to access the image server through the network connection; and a software module running on the image server schedules the access requests from different servers.

Figure 5:
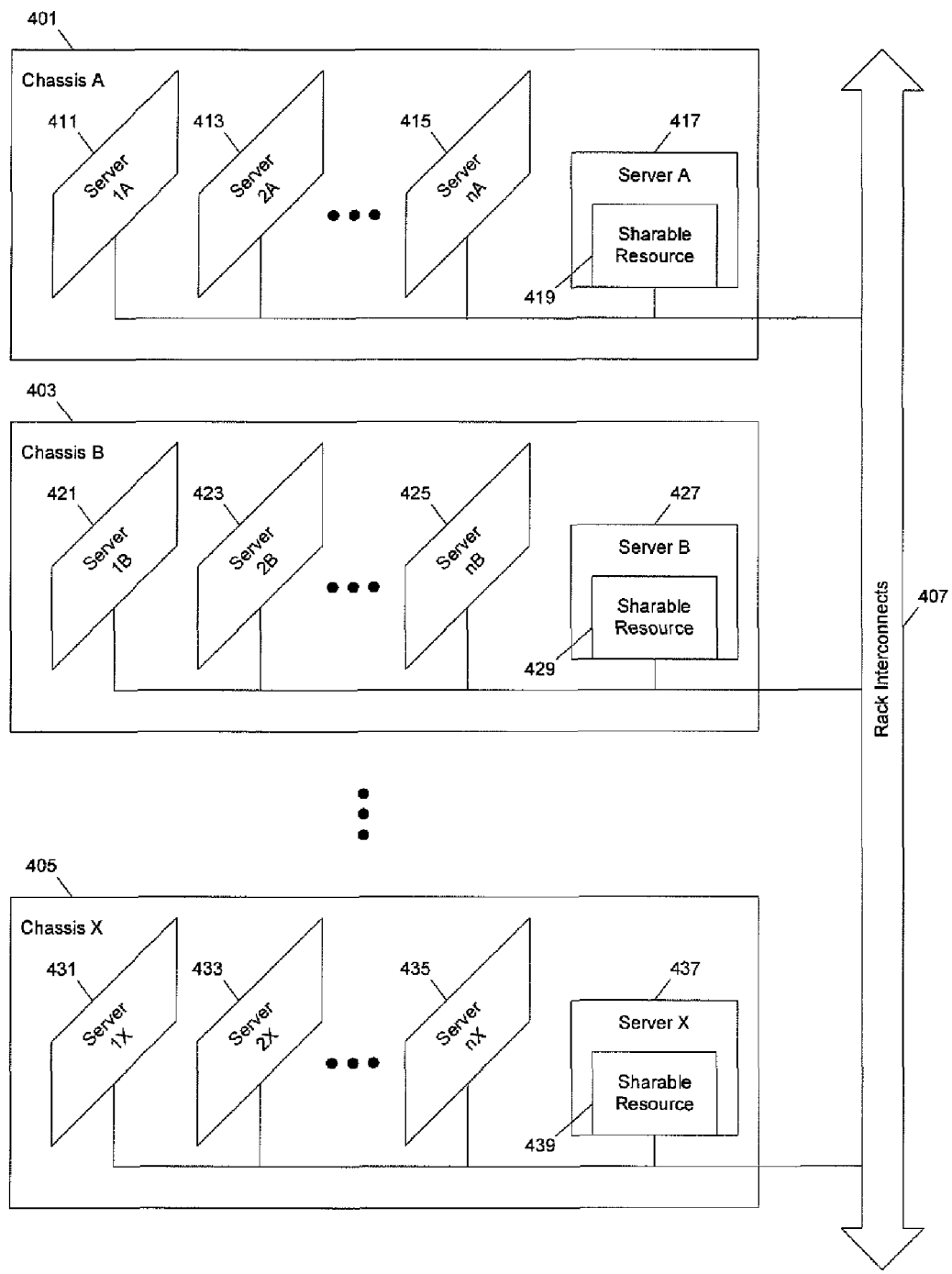
FIG. 5 shows a block diagram example of a rack of blade servers sharing memory with fault tolerant according to one embodiment of the present invention.

FIG. 5 shows a block diagram example of a rack of blade servers sharing memory with fault tolerant according to one embodiment of the present invention. In one embodiment of the present invention, rack interconnects (407) connect the servers in different chassis of a rack (e.g., chassis 401, 403, . . . 405) for accessing a shared resource. A group of servers (e.g., 417, 427, . . . , 437) have sharable resources (e.g., 419, 429, . . . , 439, such as a hard drive, a firmware memory, a co-processor, such as cryptographic co-processor). Another group of servers (e.g., blade servers 411, 413, . . . , 415 in the chassis 401, blade servers 421, 423, . . . , 425 in the chassis 403, and blade servers 431, 433, . . . , 435 in the chassis 405) do not have the corresponding resources for reduce costs. In one embodiment of the present invention, the majority of the population of servers in a given rack uses a shared resource. In one embodiment of the present invention, only one of the servers with sharable resources is elected to share its resource. The non-elected servers with sharable resources do not share their resources until the elected server fails to share its resource. In one embodiment, the non-elected elected servers also use the resource of the elected server. Further, it is understood that the servers may elect more than one server with sharable resources to improve performance.

In one embodiment of the present invention, the servers do not store information into the shared resources (e.g., read-only). Thus, once the sharable resources are configured to provide the same services, any one of the servers with the sharable resources can be elected to replace a failed one. In one embodiment of the present invention, the servers may store information into the shared resources. To prevent the loss of data, the write operations may be mirrored by at least one of the non-elected servers. For example, the non-elected servers may monitor the resource requests. When a write operation is performed, the non-elected servers may also perform the same write operations as the elected server. Thus, in such one embodiment, the non-elected servers only select and perform the write operations. Alternatively, the system may periodically synchronize the sharable resources that have been changed.

Although the example of FIG. 5 shows a configuration where each of the chassis on a rack hosts one server with sharable resource, it is understood that it is not necessary to evenly distribute the servers with sharable resources among different chassis on a server rack. In one embodiment of the present invention, the servers with sharable resources are on circuit boards of a form factor that can be hosted in the place of a typically blade server; and these servers with the sharable resources can be placed anywhere on the rack. For example, the servers with the sharable resources can be all placed inside on chassis on the rack. In one embodiment, the servers with sharable resources and the servers without these resources have the same form factor so that they are interchangeable on the rack. In one embodiment, a dynamic process identifies the servers with sharable resources and elects one as the current resource server.

Alternatively, the sharable resources can also be installed separately from the blade servers. All the blade servers in a rack can be identical, low cost servers. The sharable resources with arbiters can be installed on separate boards in the server chassis. An image server may be remote to the blade servers. The image server may also have a form factor identical to the blade servers, and thus reside in the same chassis with the blade servers. Further, this concept can be scaled out through having the image server get the resources or services from another image server. For example, the image server board can have an arbiter and a controller that can communicate over TCP/IP to get the image data from another remote system. Thus, a network of servers can share resources, such as firmware memory.

When the servers share a same firmware memory, all blade servers connected to the image server can automatically take the same personality. An intelligent image server can selectively provide customized image information (e.g., variables and parameters) to each blade. Sharing the resources for less time-critical operations can greatly reduce the cost of the system. Daisy-chaining of resources can significantly increase the fault tolerance capability of the system.

Figure 6:
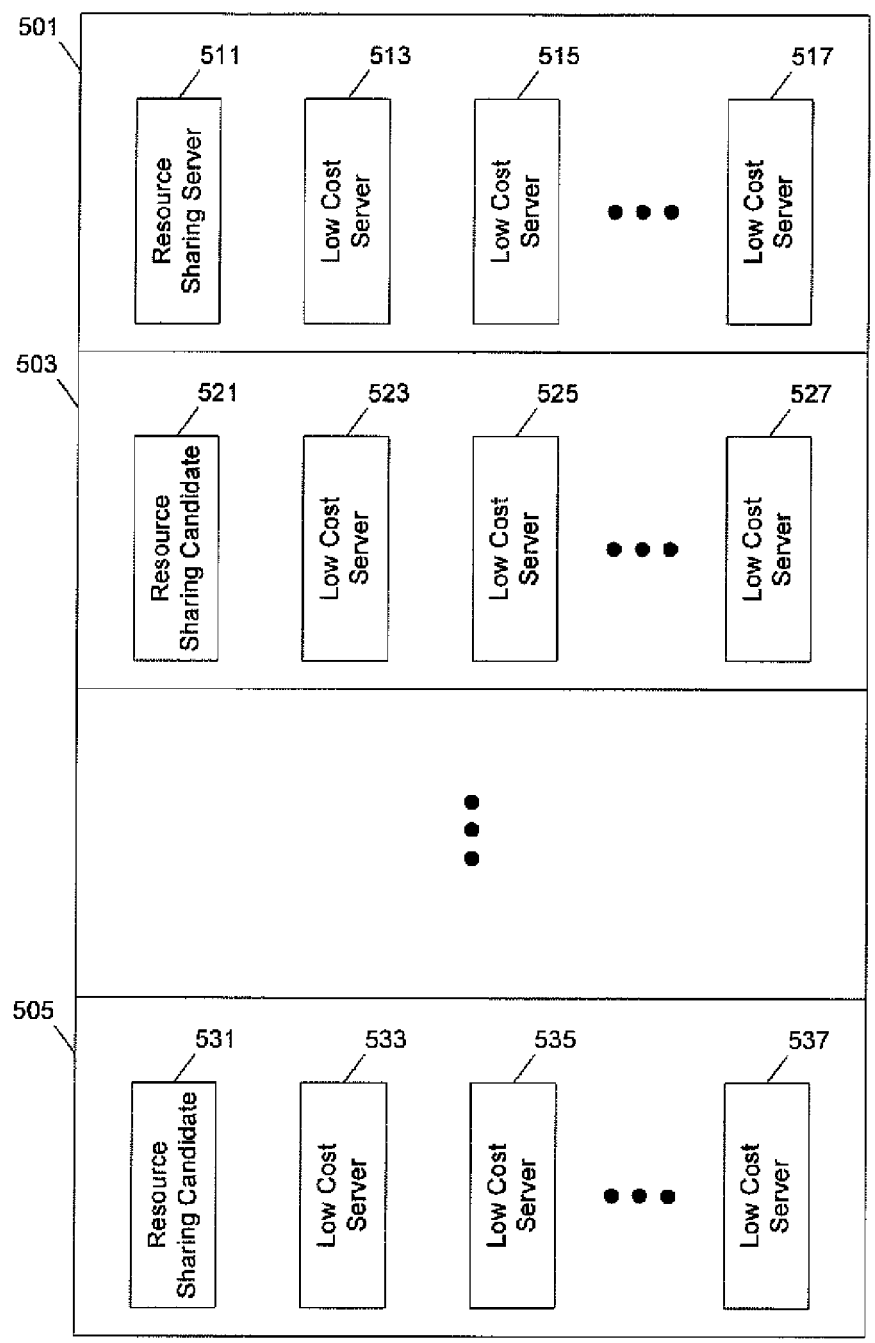
FIGS. 6-8 illustrate a process of self-healing in a rack of blade servers sharing resources according to one embodiment of the present invention.
Figure 7:
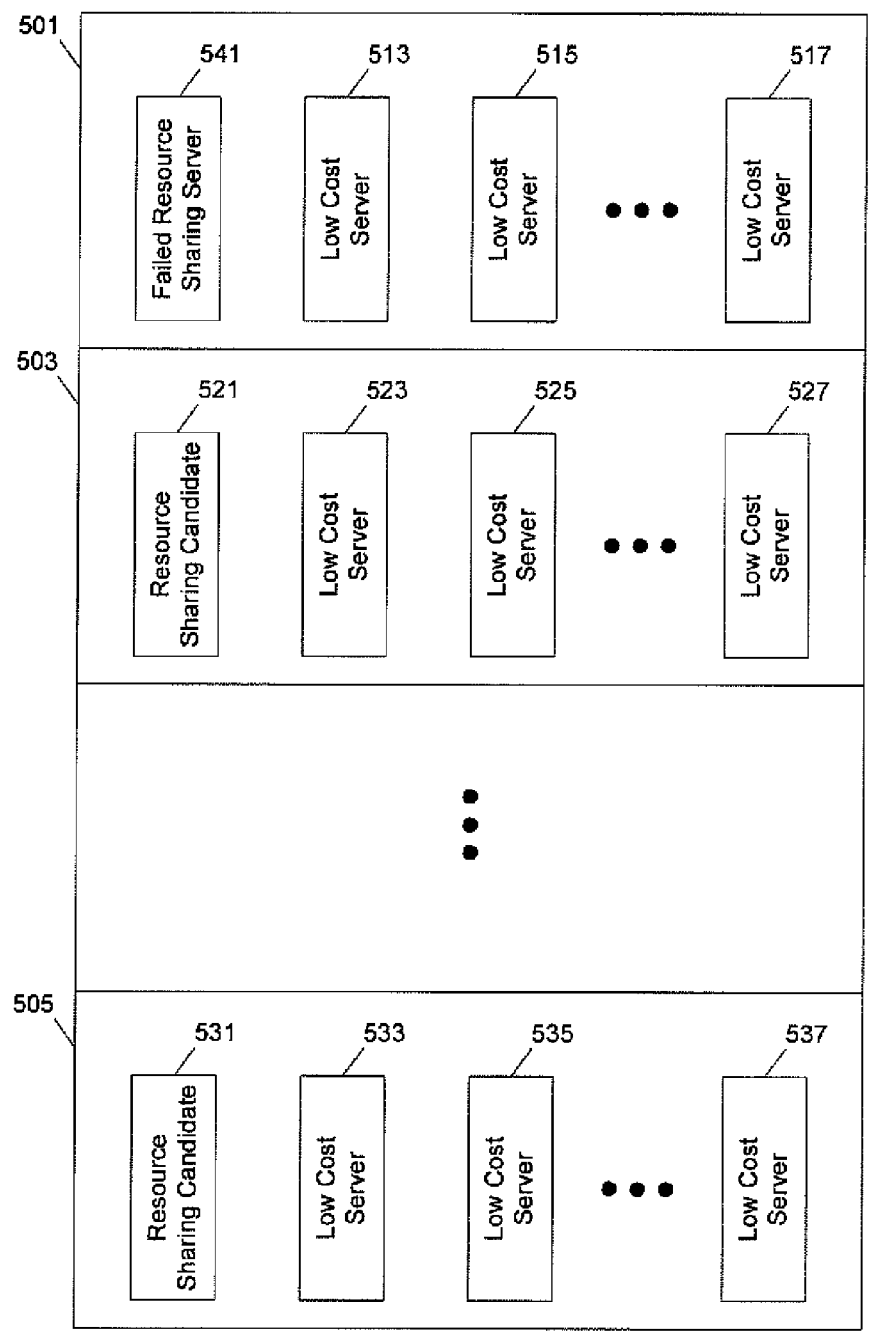
Figure 8:
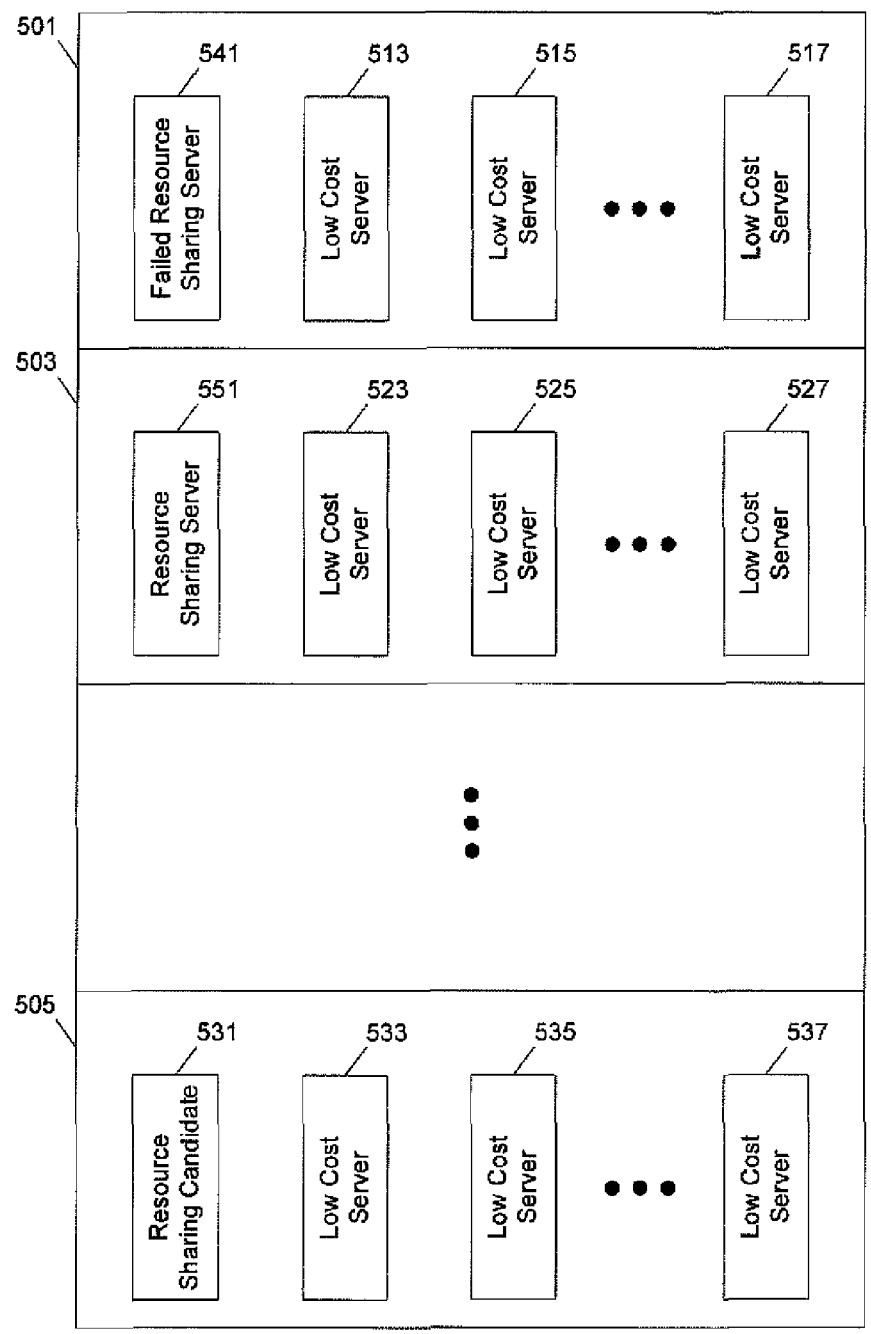

FIGS. 6-8 illustrate a process of self-healing in a rack of blade servers sharing resources according to one embodiment of the present invention. In FIG. 6, the rack of blade servers are hosted in a number of chassis (e.g., 501, 503, . . . , 505). The majority of the blade servers (e.g., 513, 515, . . . , 517, 523, 525, . . . , 527, . . . , 533, 535, . . . , 537) are low cost servers that use shared resources. A set of blade servers (e.g., 511, 521, . . . , 531) have sharable resources. One of the blade servers with sharable resources is elected as a resource sharing sever (e.g., 511). The non-elected blade servers with sharable resources are running as resource sharing candidates (e.g., 521, . . . , 531), which also uses the shared resources offered by the resource sharing sever (e.g., 511). Each of the blade servers that uses the shared resource (e.g., 531 or 537) access the shared resource on the resource sharing server (511) through chassis interconnects and rack interconnects (not shown in FIGS. 6-8).

FIG. 7 illustrates the situation when the elected server failed to serve the requests for the shared resources. In FIG. 7, the failed resource sharing server (541) cannot serve the request for the shared resources. The resource sharing candidates (e.g., 521, . . . , 531) have the sharable resources as replacements. When the failure of the elected server is detected (e.g., by the resource sharing candidates which are monitoring the resource sharing of the elected server, or by any server whose request for the shared resource is not responded to), the resource sharing candidates (e.g., 521, . . . , 531) start to elected another resource sharing server.

FIG. 7 illustrates the situation when another server is selected as the resource sharing server (551). The failed resource sharing server (541) may still be able to perform other tasks other than sharing its resource, in which case the performance of the rack of servers is not affected by the failed resource sharing server (541). Even if the failed resource sharing server (541) stops to work completely, the fault will not affect the ability of other servers to perform normal operations. The failed server may be individually replaced without shutting down the operations of other servers in the rack. Thus, the fail-tolerance of the system with shared resources is improved.

Figure 9:
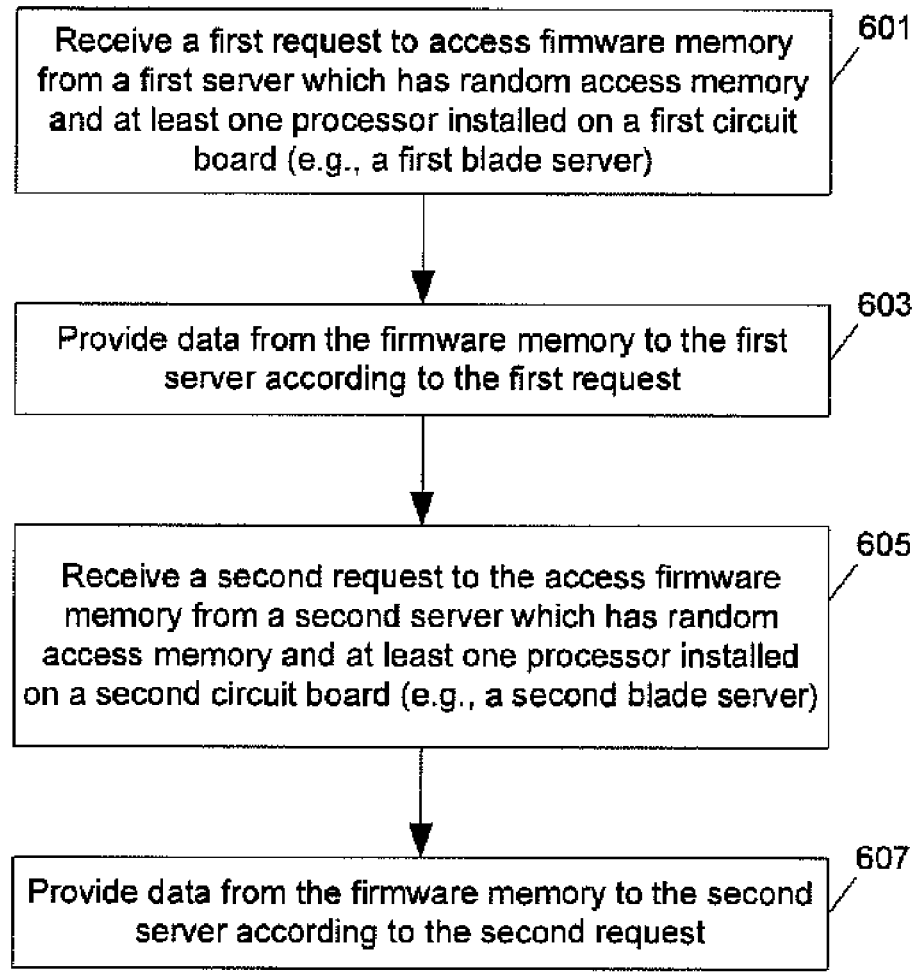
FIG. 9 illustrates a method of sharing firmware memory in a plurality of servers according to one embodiment of the present invention.

FIG. 9 illustrates a method of sharing firmware memory in a plurality of servers according to one embodiment of the present invention. After operation 601 receives a first request to access firmware memory from a first server which has random access memory and at least one processor installed on a first circuit board (e.g., a first blade server), operation 603 provides data from the firmware memory to the first server according to the first request. Operation 605 then receives a second request to the access firmware memory from a second server which has random access memory and at least one processor installed on a second circuit board (e.g., a second blade server). Operation 607 provides data from the firmware memory to the second server according to the second request. Thus, different servers share the firmware memory to reduce the cost of the data processing system. The firmware memory may be installed on the second circuit board. Alternatively, the firmware, the first and second servers are installed in one chassis; however, the firmware is installed neither on the first server nor on the second server. The firmware can be a flash memory storing data (e.g., parameters and instructions) for operating a server (e.g., the first server and the second server). The firmware may store different data (e.g., parameters) for the first server and the second server separately.

Figure 10:
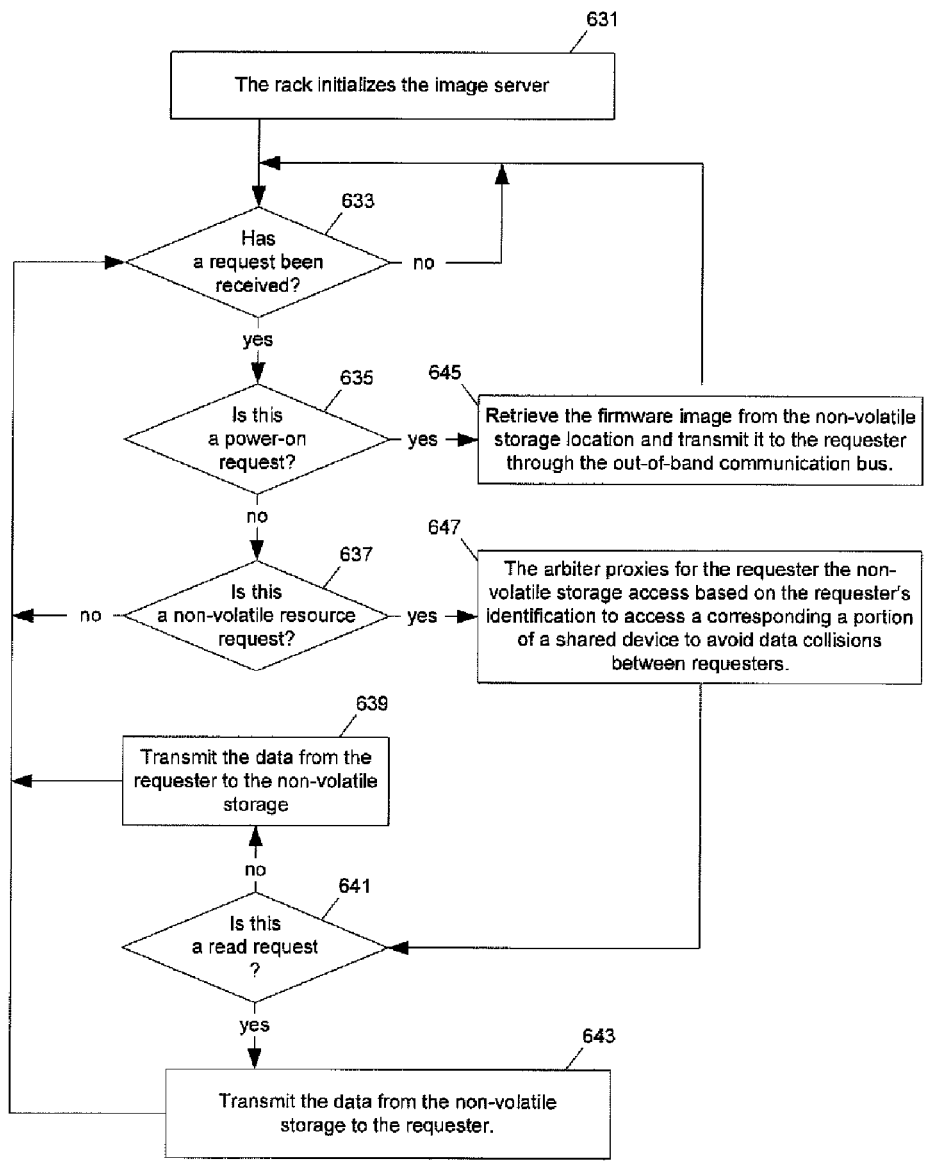
FIG. 10 illustrates a detailed flow chart of a method of sharing non-volatile memory in a rack of servers according to one embodiment of the present invention.

FIG. 10 illustrates a detailed flow chart of a method of sharing non-volatile memory in a rack of servers according to one embodiment of the present invention. In operation 631, the rack initializes the image server. When operation 633 determines that a request has been received and operation 635 determines that this is a power-on request, operation 645 retrieves the firmware image from the non-volatile storage location and transmits it to the requester through the out-of-band communication bus. Thus, the server sent the power-on request can use the firmware image to boot. If the request is not a power-on request and operation 637 determines this is a non-volatile resource request, the arbiter proxies for the requester the non-volatile storage access based on the requester's identification to access a corresponding a portion of a shared device to avoid data collisions between requesters (647). Typically, different blade servers use different portions of a shared non-volatile device for data that is specific for individual servers. In one embodiment of the present invention, the arbiter automatically maps the addresses for the servers according to identifications of the servers so that the servers do not compute different address based on their identifications. Thus, the servers need not to know their identifications in accessing the shared memory, since the arbiter can automatically determine their identification from the connections they use to access the shared device. Each server can use the same instructions to access the shared device as if the device were not shared but installed on the corresponding server in an identical fashion. Operation 641 determines whether this is a read request. If this is a read request, operation 643 transmits the data from the non-volatile storage to the requester; otherwise, operation 639 transmits the data from the requester to the non-volatile storage.

Figure 11:
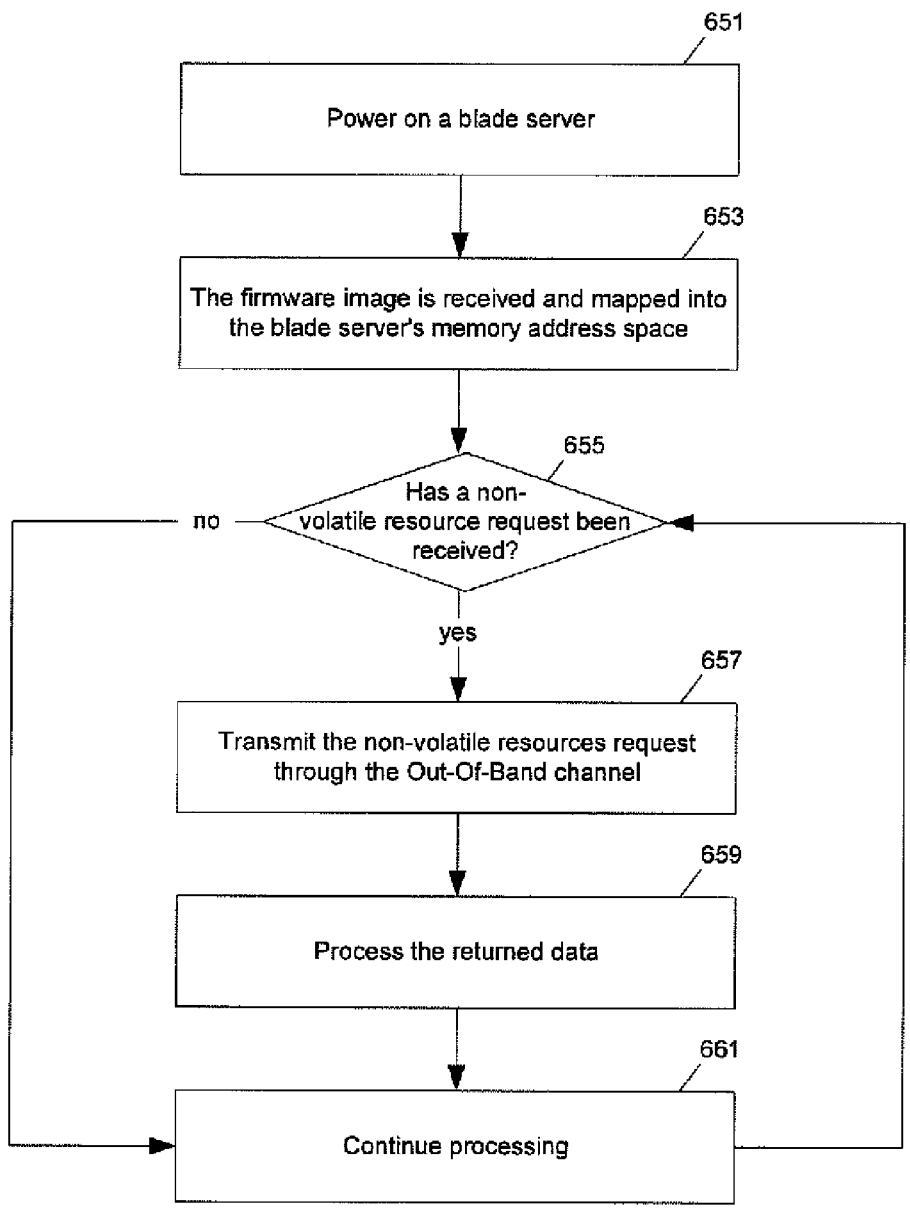
FIG. 11 illustrates a detailed flow chart of a blade server using shared non-volatile memory according to one embodiment of the present invention.

FIG. 11 illustrates a detailed flow chart of a blade server using shared non-volatile memory according to one embodiment of the present invention. After operation 651 powers on a blade server, the firmware image is received and mapped into the blade server's memory address space (653). In one embodiment, the entire firmware image is copied from the shared firmware memory into the RAM of the blade server so that the blade server needs to access the firmware memory only during the boot up time. Alternatively, the address of the firmware may be mapped into the address space so that when the instructions or parameters from the firmware memory are required, the corresponding data is fetched from the shared firmware memory. Operation 655 determines whether a non-volatile resource request has been received. If a non-volatile resource request has been received, operation 657 transmits the non-volatile resources request through the Out-Of-Band channel (e.g., interconnect 211 of FIG. 2) and operation 659 processes the returned data; otherwise, operation 661 continues processing (same as on a blade server that does not use a shared non-volatile resource).

Figure 12:
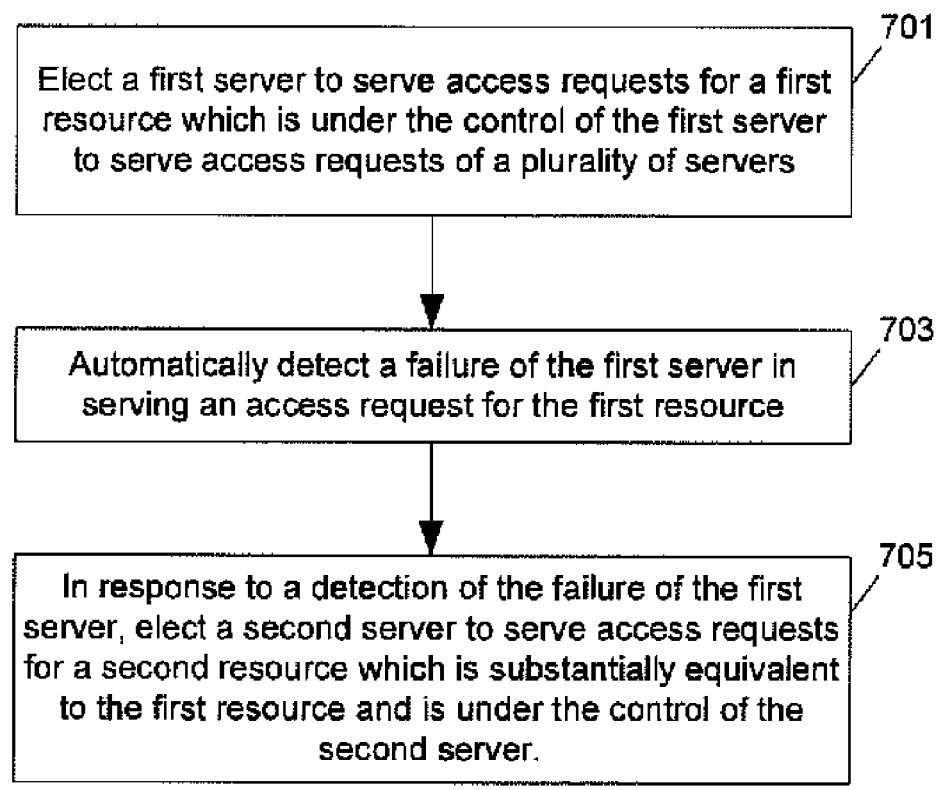
FIG. 12 illustrates a method of electing resource-sharing servers according to one embodiment of the present invention.

FIG. 12 illustrates a method of electing resource-sharing servers according to one embodiment of the present invention. Operation 701 elects a first server to serve access requests for a first resource which is under the control of the first server to serve access requests of a plurality of servers. Operation 703 automatically detects a failure of the first server in serving an access request for the first resource. In response to a detection of the failure of the first server, operation 705 elects a second server to serve access requests for a second resource which is substantially equivalent to the first resource and is under the control of the second server. For example, the first and second resources can be sharable firmware memory, which both store the same set of instructions for the plurality of servers. The plurality of severs may include the second server, which uses the resources of the first server when it is not elected. A blade server rack may include a large number of servers that do not have the firmware memory and use the firmware memory of the elected server.

Figure 13:
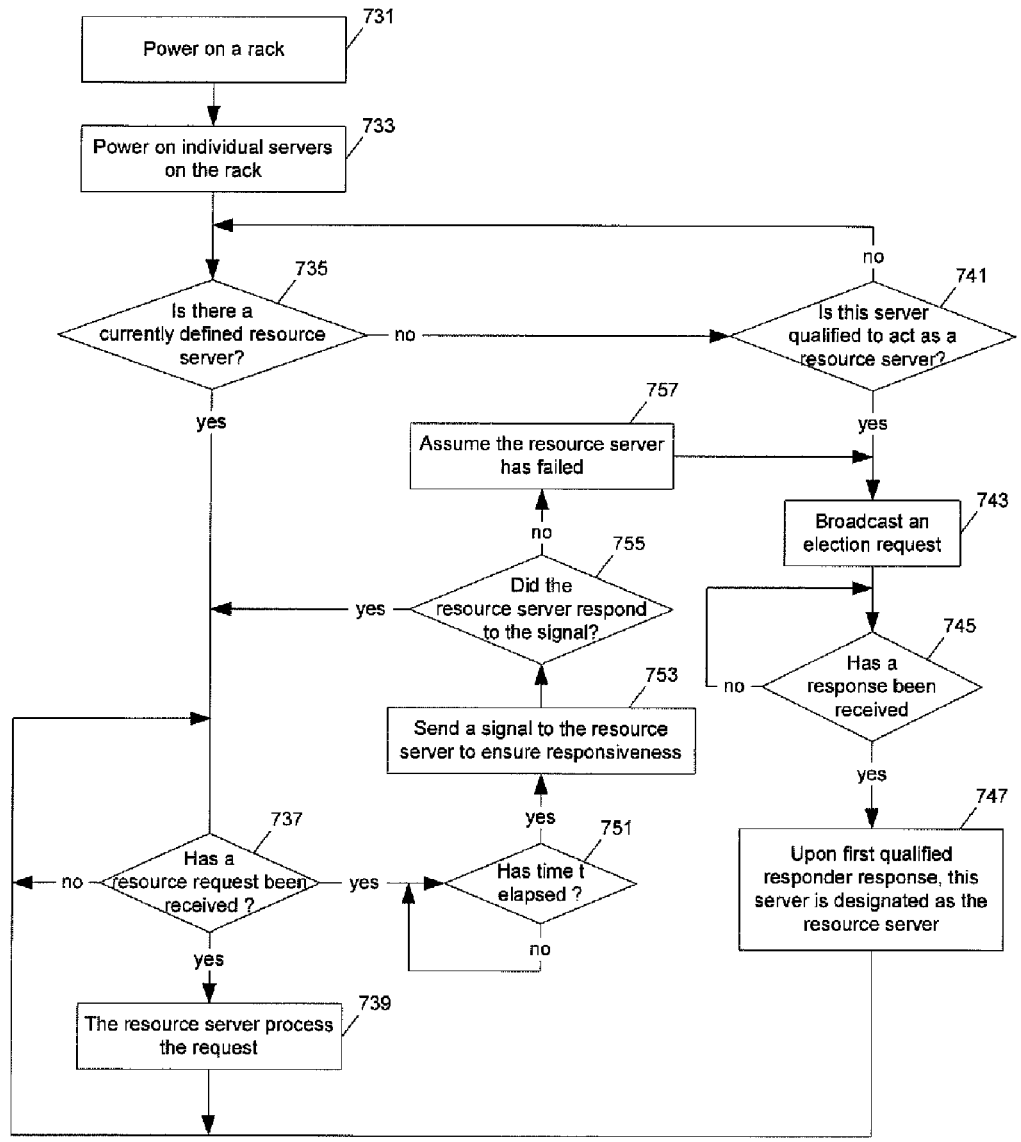
FIG. 13 illustrates a detailed flow chart of blade servers electing resource-sharing servers according to one embodiment of the present invention.

FIG. 13 illustrates a detailed flow chart of blade servers electing resource-sharing servers according to one embodiment of the present invention. After operation 731 powers on a rack, operation 733 powers on individual servers on the rack. Operation 735 determines whether there is a currently defined resource server.

If there is no currently defined resource server, operation 741 determines whether this server is qualified to act as a resource server. If this server is not qualified to act as a resource server, this server will not participate in the election; and this server cannot use a shared resource until there is a currently defined resource server. If this server is qualified to act as a resource server, this server broadcasts an election request (743) and determines whether a response has been received (745). This server will wait (or check periodically after performing other tasks) until a response has been received. Then, upon first qualified responder response, this server is designated as the resource server (747).

In one embodiment of the present invention, after receiving an election request, each server that is qualified to act as a resource server randomly wait for a short period of time. If no response to the election request is detected at the end of the random waiting period, a server that is qualified to act as a resource server broadcasts a response to the election request and this server is elected as the resource server. If two or more responses collide, no response is received. Thus, the servers sending the collide responses further wait for random periods before attempting to send a response. A server does not send a response if a response is received during the waiting period. Thus, only one server that is qualified to act as a resource server is elected as the resource server.

If there is a currently defined resource server, operation 737 determines whether a resource request has been received. If no resource request has been received, the resource server processes the request (739); otherwise, the process continues until a resource request has been received.

In one embodiment of the present invention, when there is a currently defined resource server, one or more servers that are qualified to act as a resource server but not currently elected as a resource server determine whether time t has elapsed (751) since the resource request has been received. If time t has elapsed (751) and the resource server has not yet responded to the resource request, operation 753 sends a signal to the resource server to ensure responsiveness. Operation 755 determines whether the resource server responded to the signal. If the resource server responded to the signal, the resource server is still alive. If the resource server does not respond to the signal, operation 757 assumes the resource server has failed; and thus, operation 743 broadcasts an election request to re-elect a currently defined resource server.

Various modifications can be made to the examples of FIG. 13. For example, in one alternative embodiment, the server requesting the resource monitors the health of the resource server. If the resource server does not respond to the resource request, the requesting server may perform various operations (e.g., 751, 753, 755, 757) to determine if the resource server has failed. If it is determine that the resource server has failed, the requesting server broadcasting an election request regardless whether the requesting server is qualified to act as a resource server. For example, in one alternative embodiment, any server can broadcast an election request when there is no currently defined and properly functioning resource server.

Further, a server that is qualified to act as a resource server does not have to physically possess a sharable resource. For example, the server may obtain the corresponding equivalent resource from a remote system through a network connection. Thus, different types of servers that are qualified to act as a resource server can be used in the election process to determine a best current resource server. For example, the qualified servers may choose a delay period for responding to an election request according to its capability. For example, servers with local sharable resources can reply earlier than servers relied on remote resources.

Thus, using a series of servers as backup image servers can greatly increase the fault tolerance of the system according to embodiments of the present invention. In the past, if the resource of a single server failed, the blade server would need to be replaced. According to at least some embodiments of the present invention, when a failure occurs, an alternate image server can be elected so that the data processing system (e.g., a rack of blade servers) can have a seamless recovery mechanism. A traditional rack usually may have a agent, such as a Unified Management Module ("UMM") or a chassis management module ("CMM"). From a hardware perspective, a UMM is typically similar or identical to blade servers. The UMM includes specialized firmware and/or software for conducting management functions. A CMM performs similar functions to a UMM. A UMM/CMM may constitute a single-point of failure. There have been mirroring/hot-failover schemes proposed for this agent, which are not a scalable solution. At least some embodiments of the present invention go beyond this vulnerability and allow for any of the qualified blades to become the image server (e.g., through an election process), or an agent to provide management functions, as necessary, which is more flexible, scalable, and fault-resilient. Seamlessly removing the need for resident flash memory on a blade server significantly reduces the cost of the system. The 1 to n sharing of hardware among competing computational agents further reduces the cost of the system. The seamless election mechanism and peer-to-peer management significantly increase the fault-tolerance of the system.

In the foregoing specification, specific exemplary embodiments have been described. It will be evident that various modifications may be made thereto without departing from the broader spirit and scope of the disclosure. The specification and drawings are, accordingly, to be regarded in an illustrative sense rather than a restrictive sense.

What is claimed is:

1. A method, comprising:
  electing a first server to serve access requests for a first resource, the first resource being under control of the first server to serve access requests of a plurality of servers;
  automatically detecting a failure of the first server in serving an access request for the first resource; and
  in response to a detection of the failure of the first server, electing a second server to serve access requests for a second resource, the second resource being equivalent to the first resource, the second resource being under control of the second server, wherein the first resource and the second resource are firmware memory, both the first resource and the second resource store a same set of instructions for the plurality of servers, wherein the plurality of servers comprises the second server, wherein a third server has no firmware memory, wherein the third server accesses the first resource of the first server for the set of instructions when the first server is elected and the third server accesses the second resource of the second server for the set of instructions when the second server is elected.

2. The method of claim 1, wherein the first resource comprise one of:
  a firmware memory of the first server;
  a hard drive of the first server; and
  a co-processor of the first server.

3. The method of claim 1, further comprising:
  after the detection of the failure of the first server in serving the access request for the first resource, serving the access request with the second resource of the second server.

4. The method of claim 1, wherein said automatically detecting comprises:
  determining elapse of a time period to response to the access request.

5. The method of claim 4, wherein said automatically detecting further comprises:
  sending a signal to the first server; and
  determining non-responsiveness of the first server to the signal.

6. The method of claim 1, further comprising:
  broadcasting an election request in response to the detection of the failure of the first server.

7. A data processing system, comprising:
  a plurality of first servers, each of the first servers comprising random access memory and at least one processor, the first servers comprising no non-volatile memory;
  a plurality of second servers, each of the second servers comprising random access memory and at least one processor, each of the second servers comprising a shared resource of a same kind; and
  an interconnect to couple the plurality of first servers and the plurality of second servers;
  wherein, when in operation, a first one of the second servers is automatically elected to provide the shared resource for access by the first and second servers.

8. The data processing system of claim 7, wherein, when the first one of the second servers fails to provide the shared resource for access, a second one of the second servers is automatically elected to provide the shared resource for access by the first and second servers.

9. The data processing system of claim 8, wherein the first and second servers are blade servers installed on one rack.

10. The data processing system of claim 8, wherein the shared resource comprises non-volatile memory to store instructions to operate the first and second servers.

11. The data processing system of claim 10, the non-volatile memory to store different data for the first and second servers.

12. An article of manufacture, comprising:
  a machine-accessible medium including data that, when accessed by a machine, cause the machine to perform operations comprising:
    designating a first server to serve access requests for a first resource, the first resource being under control of the first server to serve access requests of a plurality of servers;
    automatically detecting a failure of the first server in serving an access request for the first resource; and
    in response to a detection of the failure of the first server, designating a second server to serve access requests for a second resource, the second resource being equivalent to the first resource, the second resource being under control of the second server, wherein the first resource and the second resource are firmware memory, both the first resource and the second resource store a same set of instructions for the plurality of servers, wherein the plurality of servers comprises the second server, wherein a third server has no firmware memory, wherein the third server accesses the first resource of the first server for the set of instructions when the first server is elected and the third server accesses the second resource of the second server for the set of instructions when the second server is elected.

13. The article of manufacture of claim 12, wherein the plurality of servers are blade servers in a rack.

* * * * *